United States Patent [19]

Tsuzuki et al.

[11] 4,419,925

[45] Dec. 13, 1983

[54] ASSEMBLED PISTON FOR ENGINE

[75] Inventors: Yoshihiko Tsuzuki, Nagoya; Kiyoshi Uchida; Toshio Tanahashi, both of Toyota, all of Japan

[73] Assignee: Toyota Jidosha Kogyo Kabushiki Kaisha, Toyota, Japan

[21] Appl. No.: 214,504

[22] Filed: Dec. 9, 1980

Related U.S. Application Data

[63] Continuation-in-part of Ser. No. 35,682, May 3, 1979, Pat. No. 4,343,229.

[51] Int. Cl.$^{3}$ .................................................. F16J 1/00

[52] U.S. Cl. ........................................ 92/212; 92/218; 92/224; 403/343

[58] Field of Search ................. 92/172, 212, 217, 218, 92/220, 224, 255; 123/193 P; 403/343, 404; 411/307-311, 259, 263

[56] References Cited

U.S. PATENT DOCUMENTS

| | | | |
|---|---|---|---|
| 1,530,383 | 3/1925 | Livingood | 92/218 X |
| 1,553,548 | 9/1925 | Nagel et al. | 92/218 |
| 1,627,400 | 5/1927 | Meyer | 92/218 X |
| 1,634,024 | 6/1927 | Evans | 92/218 X |
| 1,668,672 | 5/1928 | Darrah | 92/218 X |
| 2,782,083 | 2/1957 | Hewson | 92/218 |
| 2,840,427 | 6/1958 | Dolza | 92/218 X |
| 3,136,306 | 6/1964 | Kamm | 92/212 X |
| 3,465,651 | 9/1969 | Tromel | 92/220 X |
| 4,242,948 | 1/1981 | Stang | 92/212 |
| 4,343,229 | 8/1982 | Tsuzuki | 92/212 |

FOREIGN PATENT DOCUMENTS

| | | | |
|---|---|---|---|
| 420605 | 10/1925 | Fed. Rep. of Germany | 92/217 |

*Primary Examiner*—Gerald A. Michalsky
*Attorney, Agent, or Firm*—Quaintance & Murphy

[57] ABSTRACT

An engine piston composed of a head and a body separately formed from the head. The head is of ceramic material and the body is light metal or light alloy. The head and the body are connected against axial movement by interengaging means provided on the head and body by rotation of the head relative to the body, and the head and body are then fixed against relative rotation by an anti-turning device, this arrangement preventing development of excessive thermal stress. The piston is of reduced weight, can be mass-produced, and reduces fuel consumption.

12 Claims, 10 Drawing Figures

ASSEMBLED PISTON FOR ENGINE

This application is a continuation-in-part of Ser. No. 35,682, filed May 3, 1979, which issued as U.S. Pat. No. 4,343,229.

BACKGROUND OF THE INVENTION

1. Field of the Invention

The present invention relates to an assembled or fabricated piston, consisting partly of ceramic material, for internal or external combustion engines.

2. Description of the Prior Art

Conventionally an engine piston is integrally molded of aluminum material, but lately for the purpose mainly of reducing fuel cost and improving the engine performance there has been an increased need for an assembled piston in which a head facing the combustion chamber and a piston body are constructed as separate pieces, the head being fabricated of a material with good heat insulation such as amber or sintered stainless steel and then being consolidated with the piston body.

In the current practice of manufacturing an assembled piston, the head and the body are bolted together at the center of the piston; or a part of the head made of material other than aluminum is integrally cast into the aluminum body when the body is cast in a mold.

This mode of fastening the head and the body, however, has the drawback that under repeated operation of the engine a difference in the thermal expansion between the head and the body causes repeated stress and deformation variations, resulting in the two parts getting loose, which may lead to engine trouble, trouble in cooling the head, or trouble in sealing.

Moreover, if the head is made of amber or sintered stainless, the piston becomes heavy, resulting in poor performance of the engine.

SUMMARY OF THE INVENTION

The primary object of the present invention is to provide a firmly and easily fastened, assembled piston for an engine, and a stable fastening structure, in which a head of ceramic material can be stably fastened to a metal body without developing a gap between them in spite of their differences in thermal expansion and without developing excessive thermal stress in the head.

Another object of the present invention is to provide an assembled piston for an engine in which ceramic material is used to reduce the piston weight and thereby increase the engine output.

Still another object of the present invention is to provide an assembled piston for an engine in which the head facing the combustion chamber is fabricated of ceramic material, thereby improving heat insulation, saving fuel, and improving combustion.

Still another object of the present invention is to provide an assembled piston for an engine which is of low-cost and easily moldable with high precision in shape and size by using glass ceramic, silicon nitride, silicon carbide or alumina as the structural material of the head.

Other objects and many of the attendant advantages of this invention will be readily appreciated as the same becomes better understood by reference to the following detailed description when considered in connection with the accompanying drawings, in which like reference characters designate the same or similar parts throughout the figures thereof.

Figure 2:
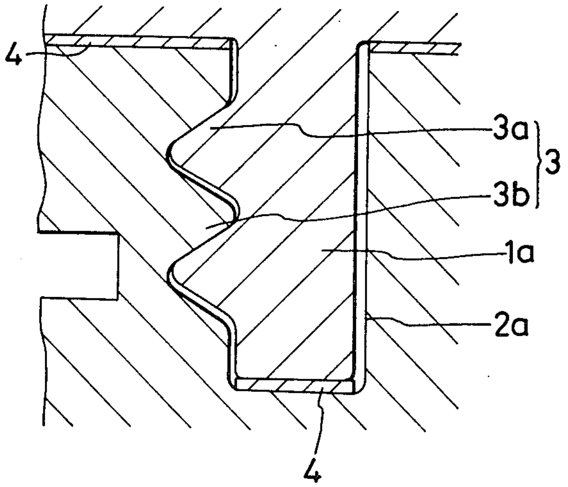
FIG. 2 is an enlarged section view showing an interengaging portion of a head and a body of the assembled piston for the engine in FIG. 1.
Figure 2A:
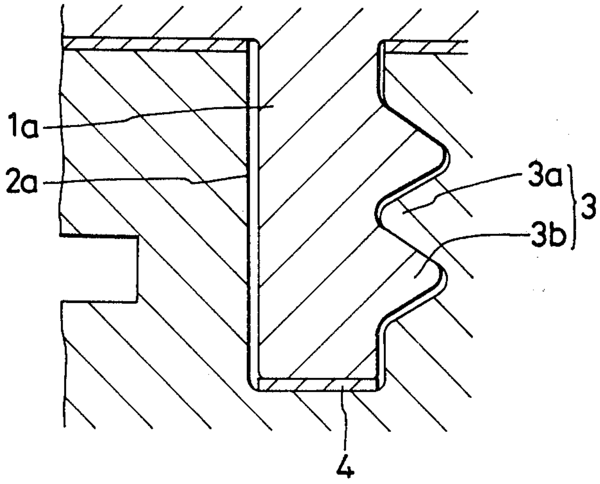

FIGS. *2a–2d* are enlarged section views showing modifications of the interengaging portion in FIG. 2.

Figure 1:
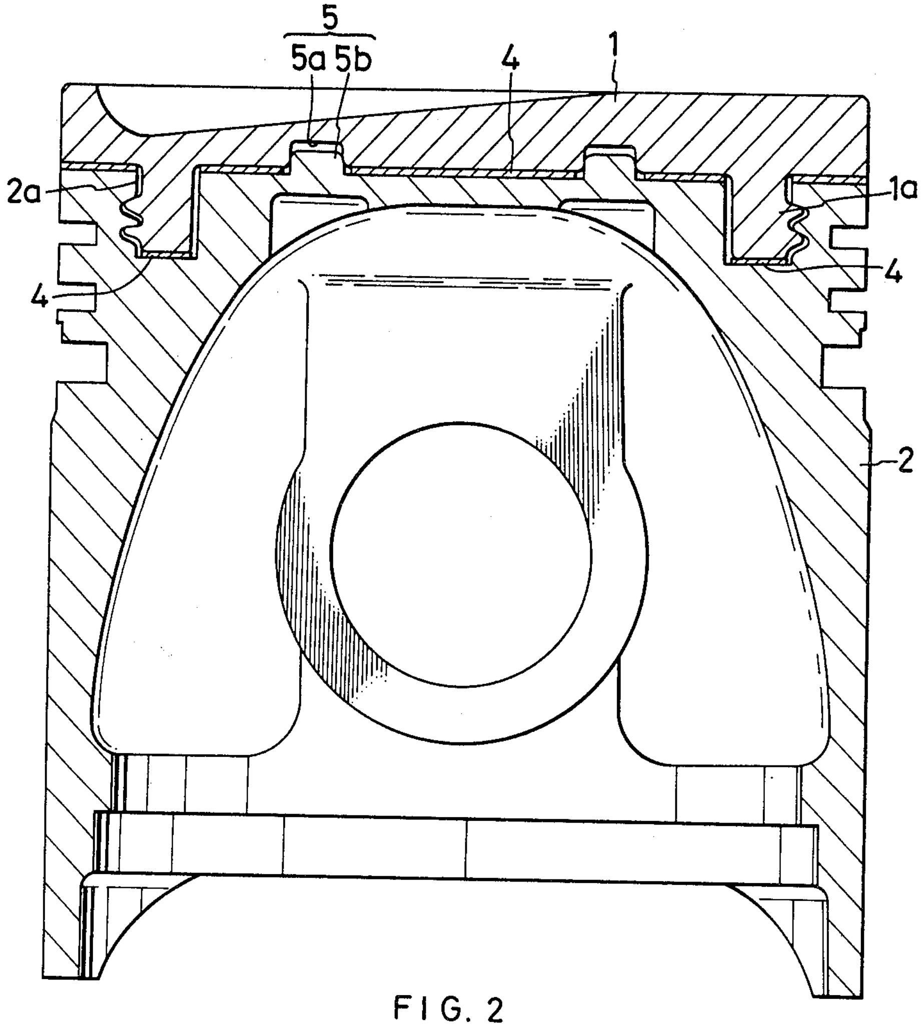
FIG. 1 is an axial section view of an assembled piston for an engine according to the present invention.
Figure 3:
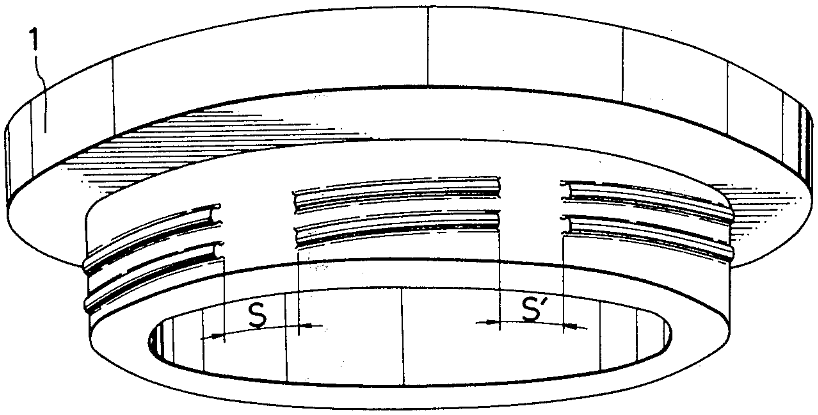
Figure 2B:
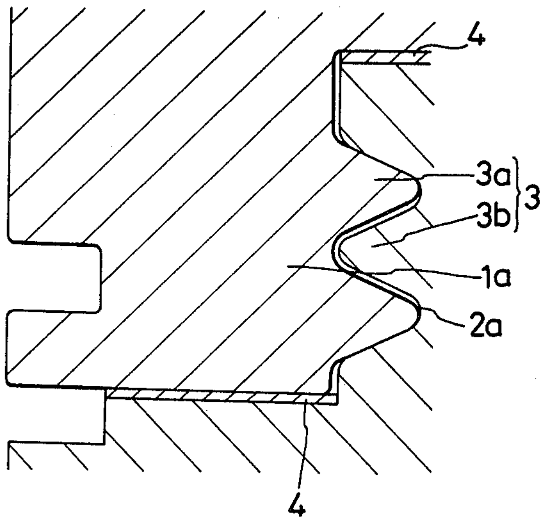
Figure 2C:
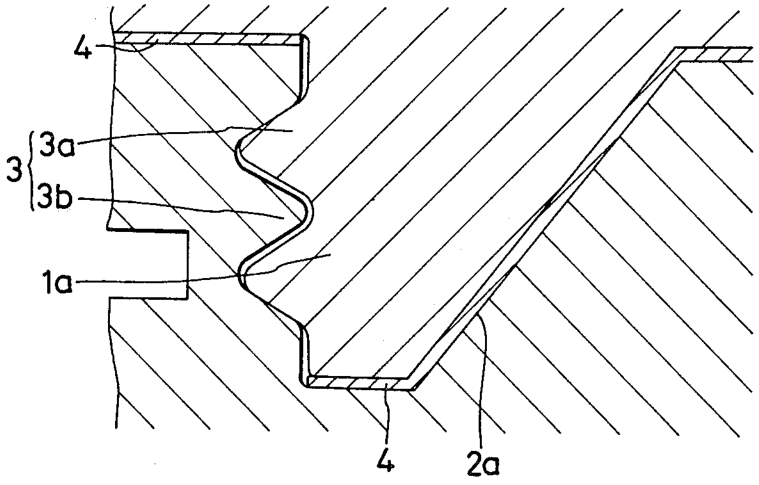
Figure 2D:
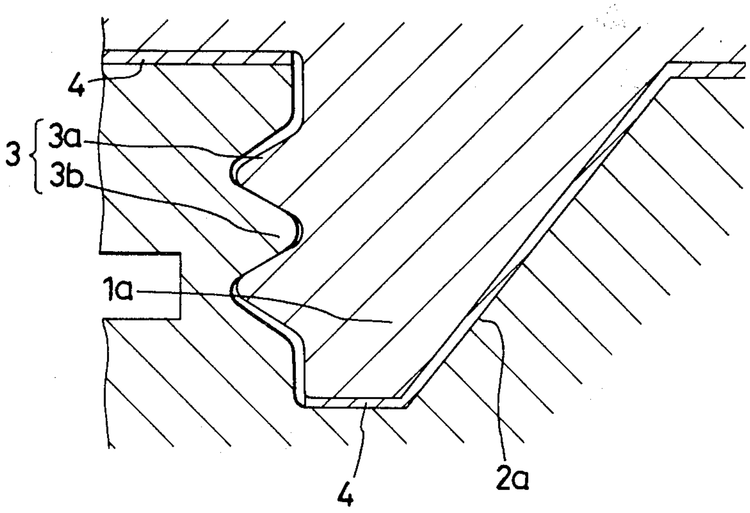

FIG. 3 is a perspective view of the head of the assembled piston for the engine in FIG. 1.

Figure 4:
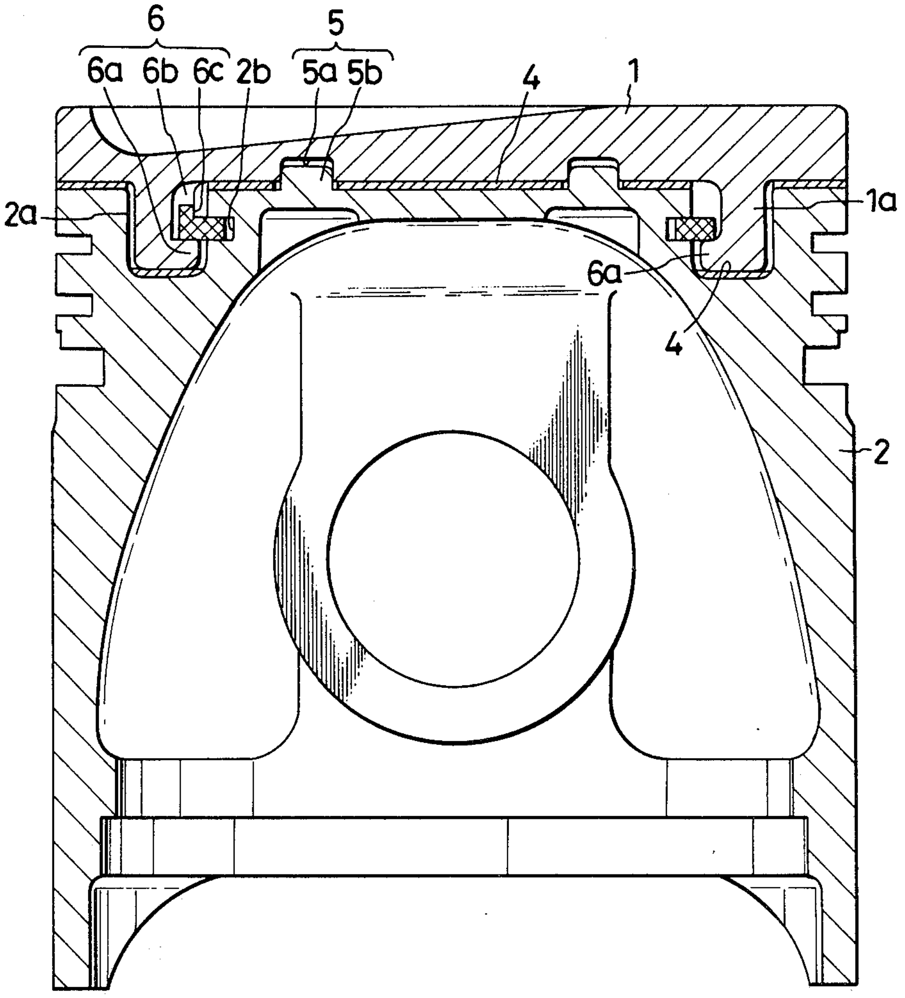

FIG. 4 is an axial section view of another assembled piston for an engine according to the present invention.

Figure 5:
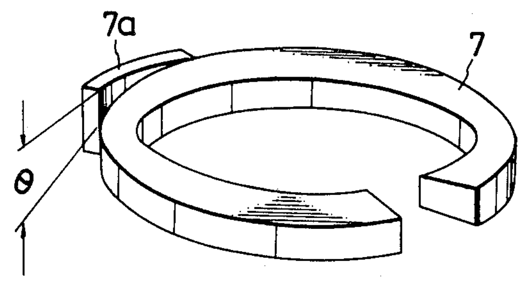

FIG. 5 is a perspective view showing a connecting means for a head and a body of the assembled piston for engine in FIG. 4.

Figure 6:
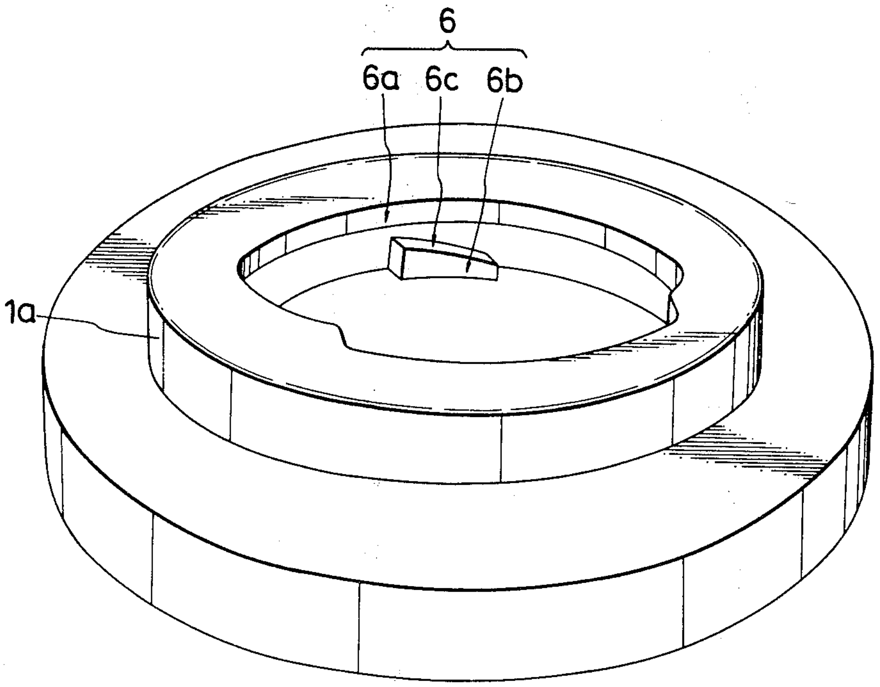

FIG. 6 is a perspective view of the head of the assembled piston for the engine in FIG. 4.

DETAILED DESCRIPTION OF THE INVENTION

Assembled engine pistons for embodiments of the invention will now be described referring to the drawings.

In FIG. 1, 1 is a head, and 2 is a body; and the two are formed as separate pieces. The head 1 is made of ceramic material, advantageously, selected from the group consisting of a high-strength glass ceramic (crystallized glass), silicon nitride, silicon carbide and alumina which are highly strong. For instance, silicon nitride used in the the present invention has around 40 $kg/mm^2$ of tensile strength and 66.5 $kg/mm^2$ of bending strength. Among others, glass ceramic is found advantageous in that it is as strong as the conventional amber or sintered stainless steel; it contributes to weight-reduction and cost-reduction; and high precision of an inclined surface on the top of the head to be formed is assured because it is moldable like molten glass to a desirable shape, and is easily to be blow-formed or press-formed by using a mold without machining. After forming it is submitted to crystallizing treatment. The glass ceramic to be used desirably has a softening point of over 600° C. and a bending strength of over 10 $kg/mm^2$ in view of the piston being used in an automobile.

The body 2 is made of light metal like aluminum or light alloy like aluminum alloy. After casting the body 2 in a mold, the peripheral surface and the grooves to fit the piston rings are finished by machining.

On the periphery of the head 1 is provided an annular projection 1*a* extending axially toward the body 2. On the top end of the body is provided an axially extending annular groove to receive the annular projection 1*a* of the head 1. Around the outer side surface of the projection 1*a* of the head are provided intermittent male threads as often seen on a glass bottle, while around the outer side wall of the groove *2a* are provided intermitted female threads *3b*. The male and female threads *3a* and *3b* constitute an interengaging means 3. The male threads are designed intermittent by the length of S as shown in FIG. 3 so that the projection 1*a* of the head 1 may enter the groove *2a* of the body 2. Where the threads on the projection 1*a* of the head take the form of the intermittent threads, vertical slots of a width equal to or a little longer than the length of threads *3a* and of a depth equal to or a little deeper than the radical height of the threads *3a* are formed. The regions between the slots radially project into the groove by the length equal to or a little narrower than S and have mating female threads *3b* formed therein.

As seen in FIG. *2a,* the female threads *3a* may be formed around the inner side wall of the projection *1a* and the male threads *3b* may be formed around the inner side wall of the groove *2a.*

In assembling the piston according to the present invention, spacers 4 are placed between the head and the body for the purpose of adjusting the axial engagement between the interengaging portions of the head and the body and providing a cushion action between them. The spacers 4 can be made of copper.

Then, the projection *1a* of the head is inserted into the groove *2a* of the body by passing the male threads *3a* through the slots. Thereupon the head 1 is turned in a circumferential direction in relation to the body 2, thus causing interengagement of the head and the body.

The fastened state can be maintained unless the head 1 is turned relative to the body 2 in such a direction that the male threads and the female threads disengage from each other; but to guarantee the maintenance of this state, an anti-turning arrangement 5 is provided to prevent the head from turning in relation to the body. This arrangement 5 can be anything routine such as a pin or a washer, so long as it prevents a relative turning between the head 1 and the body 2. FIG. 1 illustrates an example in which the anti-turning arrangement 5 is formed by extruding the body 2 either while cold or hot, after assembling, into a cavity *5a* (or several holes) formed on the underside of the head 1, thereby engaging the boss *5b* in the cavity *5a.*

Although the number of the rows of the threads is two as in the embodiments in FIGS. 1–3, needless to say, their number may be one or more than two.

Further, the sectional profile of the thread needs not always be round, but it may be triangle.

FIGS. *2b–2d* illustrate modifications of the interengaging means shown in FIG. 2. In FIGS. 2 and *2a,* the inclined upper surfaces of the partial male threads engage with the inclined upper surfaces of the partial female threads. In FIGS. *2b* and *2c,* the inclined upper surfaces of the partial male threads at an upper row engage with the inclined upper surfaces of the partial female threads, while the inclined lower surfaces of the partial male threads at a lower row engage with the inclined lower surfaces of the partial female threads. In FIG. *2d,* the inclined lower surfaces of the partial male threads at an upper low engage with the inclined lower surfaces of the partial female thread, while the inclined upper surfaces of the partial male thread at a lower row engage with the inclined upper surfaces of the partial female threads.

In FIGS. 4–6, another embodiment is illustrated. Like reference characters designate the same or similar parts and therefore duplicate explanation thereon is omitted.

On the periphery of a head 1 is an annular projection *1a* extending axially toward a body 2, the bottom end of the projection constituting a bulge or flange *6a* which extends radially inwardly of the piston. The top surface of the flange *6a* is generally flat, constituting a part of a connecting means 6. At the base of the interior of head 1 opposing flange *6a* there is a downwardly projecting boss or lug *6b* (FIGS. 4 and 6) extending over a definite length in the circumferential direction of the piston, the lug *6b* also constituting a part of the connecting means 6. On the underside of lug *6b* there is an inclined surface *6c* gradually rising or falling in the circumferential direction. The inclination of the inclined surface *6c* is desirably slight and its face is desirably wide. It is necessary that at least one lug *6b* and at least one inclined surface *6c* formed thereon be provided circumferentially of the piston. A plurality of them can be provided. *6a, 6b* and *6c* constitute a connecting means 6.

An annular radial groove *2b* is formed in the inner side wall of groove *2a* of a head, and opens into groove *2a.* Groove *2b* constitutes an engaged part of mate connecting means.

In groove *2b* there is a split ring 7 of a vertical height to be a very close fit in the groove *2b.* Ring 7 (FIG. 5) constitutes an engaging part of a cooperating connecting means, having a portion extending into groove *2a.* It is for the purpose of enabling the ring 7 to fit into groove *2a* that the ring 7 is constructed in the form of a split ring. Of course, the ring 7 can be composed of a plurality of pieces which extend in the circumferential direction of the piston. On the part of ring 7 outside groove *2b* there is an inclined surface *7a* engageable with inclined surface *6c* of the lug *6b* of the piston head, over a certain extent in the circumferential direction, the surfaces *6c* and *7a* having the same angle of inclination.

As shown in FIG. 6, the flange *6a* is partially cut away to provide a recess through which the bulge of the ring can easily pass when the ring 7 is compressed.

In groove *2b,* there is provided a means (not shown) for preventing the ring from rotating relative to the body. *6a, 6b, 6c,* and *7a* constitute an interengaging means.

In assembling the piston, at first the split ring is fitted in the groove *2b* of body 2 and is compressed radially; then the projection *1a* of the head 1 is pushed into the groove *2a* so the inner surface of flange *6a* holds the ring compressed. When the upper edge of flange *6a* passed below the lower edge of ring 7, the ring is released and expands radially to connect the head 1 to body 2. Thereupon the head 1 is turned in a circumferential direction in relation to the body, thus causing engagement of the two inclined surfaces *6c* and *7a.* In this state, the ring is prevented from turning relative to the body by appropriate means (not shown). With the top of the flange *6a* and the bottom of ring 7, and surfaces *6c* and *7a* in close engagement with each other simultaneously, the head 1 is fastened to the body with no gap in the axial direction of the piston.

The fastened state can be maintained unless the head 1 is turned relative to the body 2 in such a direction that the inclined surface *6c* and the inclined surface *7a* disengage from each other; but to guarantee the maintenance of this state, an anti-turning arrangement 5 is provided to prevent the head from turning relative to the body.

The above is a case of the connecting means 6 being formed on the head 1 and the cooperating connecting means in the form of ring 7 being separately provided on the body; but it goes without saying that the ring 7 may be held on the side of the head 1 and the connecting means 6 is provided on the body. That is, the ring 7 can be provided as a separate piece from the head 1 or the body 2, but it can be formed integrally with either the head or the body.

The assembled engine piston according to the present invention has various functions and effects as follows:

A. Use of ceramic material (especially glass ceramic) for the head provides the following merits:

1. The head is easy to mold to form an inclined surface or a projection or a cavity; and it is suitable for mass production;

2. On account of low thermal conductivity, the engine is thermally well insulated, thereby saving fuel and improving combustion;

3. On account of low specific gravity, the ceramic material, unlike conventional heat insulating material, contributes to weight reduction of the piston;

4. If glass ceramic is employed, sufficient strength is assured, and molding can be done with sufficient precision before crystallizing treatment, resulting in a high-precision high-strength head;

5. Glass ceramic, unlike the conventional sintered ceramic, prevents abnormal abrasion of engine parts due to worn particles; and 6. Glass ceramic can be adapted to a certain extent to the rate of thermal expansion of the mating metal.

B. Since the union of head and body is effected by engagement of inclined surfaces, a possible slackness developed in the rotational direction under repeated thermal expansion can be mitigated in the axial direction of the piston by the extent of inclination; namely, putting the angle of inclination as $\theta$, the axial clearance can be expressed by the product (rotational clearance x tan $\theta$) and accordingly the axial clearance can be held down to a magnitude that can be virtually neglected.

C. Since the engagement is done between inclined surfaces, the areas of engagement can be made wide enough to prevent damage.

D. Since the rotational clearance is restrained by an anti-turning device, it is possible to lock the head in the body with practically no clearance.

What is claimed is:

1. An assembled engine piston comprising a metal body member having an axially extending annular recess at the top end thereof, said recess extending to a top surface of said body, a ceramic material head member on the top of said body, said head comprising an axially extending annular projection extending into said recess, radially extending interengaging means within said recess and on said projection and said body for securing said head to said body against relative axial movement in response to rotation of said head with respect to said body, said interengaging means comprising at least two rows of threads of conical section on said projection, and threads on said body, said rows of threads comprising an upper thread and a lower thread, said lower thread of said projection having an inclined lower surface engaged by a correspondingly inclined lower surface of a body thread, and said upper thread having an inclined upper surface engaged by a correspondingly inclined upper surface of a body thread, so that the threads of said body exert forces on the threads of said projection which tend to compress the portion of the projection between said upper and lower threads, and means to prevent relative rotation of said head and body.

2. Assembled engine piston of claim 1, wherein the ceramic material of said head is one selected from among crystallized glass, alumina, silicon nitride and silicon carbide.

3. Assembled engine piston of claim 2, wherein said crystallized glass has a softening point of over 600° C. and a bending strength of over 10 $Kg/mm^2$.

4. Assembled engine piston of claim 1, wherein said head comprises a molded head.

5. Assembled engine piston of claim 1, wherein the metal to constitute the body is selected from the group consisting of light weight aluminum or light weight aluminum alloy.

6. Assembled engine piston of claim 1, wherein said means to prevent relative rotation of the head and body comprises a cavity formed on one of said members and a boss formed on the other of said members to engage said cavity.

7. Assembled engine piston of claim 6, wherein said cavity is formed on the head; and said boss is formed by cold or hot pressing a part of the body into said cavity after head-body assembling.

8. Assembled engine piston of claim 1, wherein a spacer is placed between the top of the body and the bottom of the head.

9. Assembled engine piston of claim 8, wherein said spacer is fabricated of copper.

10. Assembled engine piston of claim 1, wherein said threads of said body and said projection extend only partly in the circumferential direction so that said threads can go past each other when said projection of the head is placed in said recess of the body for head-body assembling.

11. Assembled engine piston according to claim 1, wherein said threads on the projection of the head comprise male threads and said threads on said body comprise female threads.

12. Assembled engine piston according to claim 1, wherein said threads on the projection of the head comprise female threads, and said threads on said body comprise male threads.

* * * * *